United States Patent
Zhang et al.

(10) Patent No.: US 9,515,916 B2
(45) Date of Patent: Dec. 6, 2016

(54) REDIRECTION OF REQUESTS FOR TARGET ADDRESSES

(75) Inventors: Zhunian Zhang, Sunnyvale, CA (US); Steven V. Luong, San Jose, CA (US); Manish Bhardwaj, San Jose, CA (US); Stefano Previdi, Rome (IT)

(73) Assignee: CISCO TECHNOLOGY, INC., San Jose, CA (US)

(*) Notice: Subject to any disclaimer, the term of this patent is extended or adjusted under 35 U.S.C. 154(b) by 1429 days.

(21) Appl. No.: 12/909,595

(22) Filed: Oct. 21, 2010

(65) Prior Publication Data

US 2012/0102223 A1 Apr. 26, 2012

(51) Int. Cl.
| | |
|---|---|
| G06F 15/16 | (2006.01) |
| H04L 12/721 | (2013.01) |
| H04L 12/715 | (2013.01) |
| H04L 29/08 | (2006.01) |
| H04L 12/18 | (2006.01) |
| H04L 12/14 | (2006.01) |
| G06F 15/173 | (2006.01) |

(52) U.S. Cl.
CPC .............. *H04L 45/12* (2013.01); *H04L 45/04* (2013.01); *H04L 67/2814* (2013.01); *G06F 15/16* (2013.01); *G06F 15/173* (2013.01); *H04L 12/1489* (2013.01); *H04L 12/18* (2013.01); *H04L 12/1877* (2013.01)

(58) Field of Classification Search
CPC .. H04L 12/18; H04L 12/1877; H04L 12/1489; H04L 25/12; H04L 25/04; H04L 67/2814; G06F 15/16; G06F 15/173
See application file for complete search history.

(56) References Cited

U.S. PATENT DOCUMENTS

| | | | | |
|---|---|---|---|---|
| 6,256,675 | B1 * | 7/2001 | Rabinovich | 709/241 |
| 6,658,000 | B1 * | 12/2003 | Raciborski | G06F 17/30864 370/386 |
| 6,778,496 | B1 * | 8/2004 | Meempat | H04L 45/123 370/230 |
| 7,213,062 | B1 * | 5/2007 | Raciborski | G06F 17/30864 707/E17.108 |
| 7,889,655 | B2 * | 2/2011 | Retana et al. | 370/235 |

(Continued)

FOREIGN PATENT DOCUMENTS

| | | |
|---|---|---|
| CN | 1852213 A | 10/2006 |
| EP | 2086206 A1 | 8/2009 |

OTHER PUBLICATIONS

D. Oran, RFC 1142, "OSI IS-IS Intra-Domain Routing Protocol", Feb. 1990 (157 pages).

(Continued)

*Primary Examiner* — Krista Zele
*Assistant Examiner* — Anthony Fabbri
(74) *Attorney, Agent, or Firm* — Polsinelli PC (57) ABSTRACT

In one embodiment, a first network device may receive a request for an identifier of at least one target to service a client. The first network device may obtain an identifier of each of two or more targets. The first network device may then determine whether to redirect the request. The first network device may redirect the request to a second network device according to a result of the determining step, where the first network device is in a first autonomous system and the second network device is in a second autonomous system.

20 Claims, 8 Drawing Sheets

(56) References Cited

U.S. PATENT DOCUMENTS

| | | | | |
|---|---|---|---|---|
| 8,085,799 | B2* | 12/2011 | Curtis | H04L 45/00 370/350 |
| 2001/0056416 | A1* | 12/2001 | Garcia-Luna-Aceves | G06F 12/1483 |
| 2002/0013856 | A1* | 1/2002 | Garcia-Luna-Aceves | H04L 45/02 709/238 |
| 2003/0026268 | A1* | 2/2003 | Navas | H04L 29/12009 370/400 |
| 2003/0145066 | A1* | 7/2003 | Okada | H04L 29/12009 709/219 |
| 2004/0081154 | A1* | 4/2004 | Kouvelas | H04L 12/4633 370/392 |
| 2004/0218536 | A1* | 11/2004 | Yasukawa et al. | 370/238 |
| 2005/0036500 | A1* | 2/2005 | Rodeheffer | H04L 12/462 370/401 |
| 2005/0105524 | A1* | 5/2005 | Stevens | H04L 45/04 370/389 |
| 2006/0133282 | A1* | 6/2006 | Ramasamy | H04L 45/00 370/238 |
| 2007/0101018 | A1* | 5/2007 | Shirazipour | H04L 12/5695 709/238 |
| 2007/0133420 | A1* | 6/2007 | Guven | H04L 45/12 370/238 |
| 2007/0133618 | A1* | 6/2007 | Brolin | 370/514 |
| 2007/0183334 | A1* | 8/2007 | White | H04L 45/00 370/238 |
| 2007/0201355 | A1* | 8/2007 | Vasseur | H04L 45/00 370/217 |
| 2007/0214275 | A1* | 9/2007 | Mirtorabi et al. | 709/230 |
| 2007/0263532 | A1* | 11/2007 | Mirtorabi et al. | 370/228 |
| 2008/0077710 | A1* | 3/2008 | Kouvelas | H04L 12/1854 709/250 |
| 2008/0098180 | A1* | 4/2008 | Larson | G06F 15/16 711/150 |
| 2008/0310433 | A1* | 12/2008 | Retana | H04L 45/02 370/401 |
| 2009/0296571 | A1* | 12/2009 | McCourt | G06F 15/173 370/225 |
| 2010/0125626 | A1* | 5/2010 | Lucas et al. | 709/203 |
| 2010/0202448 | A1* | 8/2010 | Previdi et al. | 370/389 |

OTHER PUBLICATIONS

Y. Rekhter, RFC 1771, "A Border Gateway Protocol (BGP-4)", Mar. 1995 (57 pages).
J. Moy, RFC 2328, "OSPF Version 2", Apr. 1998 (244 pages).
European Search Report dated Dec. 27, 2011, EP Application No. 11185673.8.
Cisco: "Data Center Services System", Retrieved from Internet: URL:http://www.cisco.com/en/US/prod/collateral/routers/ps5763/DC_Services_System_WP.pdf, Mar. 31, 2010, pp. 1-12.
Ng et al., "A Network Positioning System for the Internet", Jun. 10, 2004, pp. 1-14, retrieved from the Internet: URL:http://www.cs.rice.edu/eugeneng/papers/USENIX04.pdf, Dec. 13, 2011.
McDevitt, H. "Load Sharing with DNS", Dec. 27, 2006, pp. 1-5, Retrieved from the Internet:URL:http://ntrg.cs.tcd.ie/undergrad/4ba2.01/group8/DNS.html.
First Search Report for CN Application No. 2011104179303 dated Mar. 24, 2014.

* cited by examiner

| IP Address | AS_PATH | NEXT_HOP | | |
|---|---|---|---|---|
| Proximity Engine 1 | 1 → 2 → 3 | 10.1.3.5 | | |
| Proximity Engine 2 | 2 → 3 | 12.4.3.5 | | |
| Target 1 | 1 → 2 → 3 | 14.3.4.5 | | |
| Target 2 | 1 → 2 → 4 | 13.3.2.5 | | |
| | | | | |
| | | | | |

FIG. 7A

| IP Address | Cost |
|---|---|
| 14.3.4.5 | 20 |
| 13.3.2.5 | 80 |

FIG. 7B

REDIRECTION OF REQUESTS FOR TARGET ADDRESSES

BACKGROUND

1. Technical Field

The present disclosure relates generally to redirection of requests for target Internet Protocol (IP) addresses in a communication network and more particularly, to redirection of requests for target IP addresses based upon the distance of the target IP addresses from the clients submitting the requests.

2. Description of the Related Art

A peer-to-peer network is an example of a network that may be overlaid on another network such as the Internet. In such networks, it is often the case that a piece of content or a service desired by one of the peers can be provided by more than one node in the overlay network. In these instances, it is often desirable to select a source node in the overlay network to optimize efficiency.

DESCRIPTION OF EXAMPLE EMBODIMENTS

In the following description, numerous specific details are set forth in order to provide a thorough understanding of the disclosed embodiments. It will be obvious, however, to one skilled in the art, that the disclosed embodiments may be practiced without some or all of these specific details. In other instances, well known process steps have not been described in detail in order to simplify the description.

Overview

In one embodiment, a first network device may receive a request for an identifier of at least one target to service a client. The first network device may obtain an identifier of each of two or more targets. The first network device may then determine whether to redirect the request. The first network device may redirect the request to a second network device according to a result of the determining step, where the first network device is in a first autonomous system and the second network device is in a second autonomous system.

Specific Example Embodiments

In a network, a source entity requesting data or services from a destination entity may be referred to as a client. The client may be implemented via a client program installed on a client device. The client device may, for example, be a desktop computer, laptop computer, or a handheld device such as a cell phone.

A destination entity of a request may be referred to as a target. A target may be implemented by a network device such as a web server or storage device. In addition, the target may be configured with software that enables the target to process requests from a client, as well as to obtain and transmit the requested data or services to the client.

A client may wish to obtain data or services from a target. However, where a system includes multiple targets, it is generally desirable for the client to obtain the desired data or services from the target that is closest to the client. The disclosed embodiments enable a target that is closest (e.g., having a shortest routing path) to a client to be identified. One protocol that addresses the task of path determination in today's networks is the Border Gateway Protocol (BGP).

Border Gateway Protocol (BGP) performs interdomain routing in Transmission-Control Protocol/Internet Protocol (TCP/IP) networks. BGP is an exterior gateway protocol (EGP), which means that it exchanges routing information and performs routing between gateway devices of different autonomous systems. Through the exchange of routing information via BGP, gateway devices can obtain routing information for paths between autonomous systems. However, the routing information only represents information available via BGP. As a result, gateway devices of multiple autonomous systems may not have sufficient information to select the best available route.

Within the Internet, an autonomous system (AS) may be a collection of connected IP routing prefixes (e.g., including routers and links) under the control of a common entity or administration (e.g., enterprise network or service provider network) that presents a common, clearly defined routing policy to the Internet. A unique Autonomous System Number (ASN) is allocated to each AS for use in BGP routing. Therefore, the ASNs may uniquely identify each network on the Internet.

Each AS may include one or more border routers. A border router may be a router that has connections to devices in more than one AS.

Interior Gateway Protocol (IGP) is a routing protocol that may be deployed inside an AS and used to create routing schemes including nodes (e.g., routers) and links that form the network topology through which IP packets are routed/forwarded. Example IGPs include Open Shortest Path First (OSPF, a link-state routing protocol), Intermediate System to Intermediate System (ISIS, another link-state routing protocol), Enhanced Interior Gateway Routing Protocol (EIGRP), and Routing Information Protocol (RIP).

Link-state protocols are routing protocols based on link-state advertisements. Examples of link state protocols include ISIS and OSPF. Charateristics of link-state protocols include the advertising by each node of its local connectivity to the rest of the other nodes. Link state protocols use characteristics of the route such as cost to determine the best path. This is in contrast to distance-vector protocols, where each node advertises the content of its routing table to its adjacent neighbors.

Shortest Path First (SPF) and Reverse Shortest Path First (R-SPF) are algorithms that can be executed by each router in a link-state network (e.g.,each router that executes SPF or R-SPF). The purpose of SPF is to build a routing information base (RIB) that is used by the router to route/forward IP packets. The algorithm can use data structures and logic. More particularly, the data structures can include three lists. An UNKNOWN list may identify all nodes known in the topology (network) for which no path has been computed yet. A TENTATIVE list may identify nodes for which at least one path has been computed (but may not be the shortest one). A PATHS list may identify a list of nodes for which the shortest path to it has been computed. An SPF or R-SPF algorithm runs by moving nodes from one list to another in the order UNKNOWN->TENTATIVE->PATHS, and stops when the TENTATIVE list is emptied. An example SPF algorithm is the Dijkstra algorithm. The difference between SPF and R-SPF is in the way the nodes are inspected and evaluated during the algorithm. The SPF algorithm computes the shortest path based on the cost from a reference node to each other node in the network, while the R-SPF algorithm takes into account the reverse metric, i.e., the metric from each node in the network to the reference node.

A Network Positioning System (NPS) may implement enhanced proximity services in the network. More particularly, a client in a NPS may submit a request for a target IP address via which to obtain data or service(s). Given a list of destination targets, the NPS determines which targets are closest to the client requesting a target address. The NPS may then rank the target addresses based upon the distance of the target addresses from the client and provide a list of one or more ranked IP addresses in response to the request.

As will be described in further detail below, the network infrastructure of the NPS obtains routing information via routing protocols such as IGP and BGP. Through the use of the routing information, the NPS can recommend the target(s) that provide an optimal path to the client requester. In this manner, the NPS improves the user experience while reducing costs.

The disclosed embodiments enable a request for an Internet Protocol (IP) address of a suitable target submitted by a client to be redirected by a Network Positioning System Server (NPS Server) receiving the request, as appropriate. More particularly, the NPS Server may redirect the request to another, second NPS Server if the NPS Server cannot accurately determine which one of two or more targets is closest to the client. In the following description, a NPS Server is described as being implemented in a network device. The network device may, for example, be a router implementing various routing protocols and Network Positioning Systems functions, as will be described in further detail below.

Each of the targets may include one or more network devices (e.g., storage devices or web servers) storing thereon content that may be requested by one or more clients. For example, the targets may include one or more streamers capable of streaming media audio and/or video data such as radio or television broadcasts. As a result, it is desirable to provide clients requesting content an IP address of a target that provides an optimal transmission path.

Example Network Positioning Systems (NPSs) in which the disclosed embodiments may be implemented will be described in further detail below with reference to FIGS. 1-3, while methods of performing various embodiments of the invention will be described in further detail below with reference to FIGS. 4-6.

Figure 1:
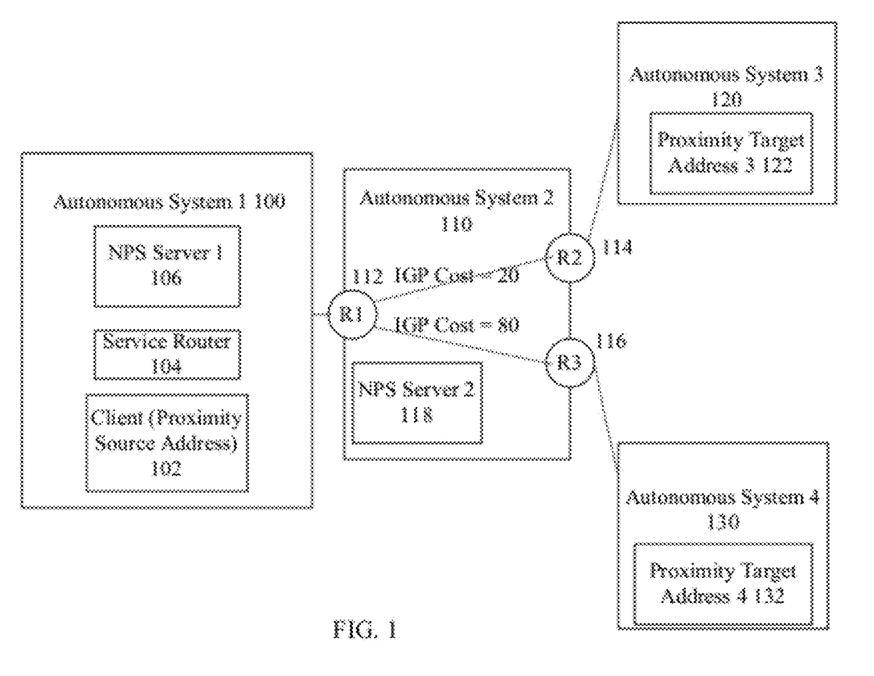
FIG. 1 is a diagram illustrating a first example system in which the disclosed embodiments may be implemented.

FIG. 1 is a diagram illustrating an example system in which the disclosed embodiments may be implemented. In this example, multiple autonomous systems are shown. As shown in FIG. 1, a first Autonomous System, Autonomous System 1 100, may include a client 102 identified by a Proximity Source Address (PSA). The client 102 may send a request to a service router 104 to obtain a target address, which may be referred to as a Proximity Target Address (PTA). The service router 104 may initially be configured with a set of two or more target addresses (e.g., IP addresses). In response to the request from the client 102, the service router 104 may then provide the set of two or more target addresses to a first NPS Server, NPS Server 1 106. The NPS Server 1 106 may then identify one of the set of two or more target addresses that provides an optimal path. The NPS Server 1 106 may then provide the identified target address to the service router 104. The service router 104 may then provide the identified target address to the client 102. It is important to note that although the service router 104 and NPS Server 1 106 are illustrated separately, the service router 104 and NPS Server1 106 need not be implemented in separate network devices. Rather, the service router 104 and NPS Server 1 106 may be implemented in a single network device.

As shown in this example, a second Autonomous System, Autonomous System 2 110, includes three border routers, R1 112, R2 114, and R3 116. Each AS may or may not include a NPS Server. In this example, Autonomous System 2 110 includes a second NPS Server, NPS Server 2 118.

A third Autonomous System, Autonomous System 3 120, includes a first target identified by a Proximity Target Address 3 122. A fourth Autonomous System, Autonomous System 4 130, includes a second target identified by a Proximity Target Address 4 132.

In accordance with various embodiments, a NPS Server may rank targets according to the costs associated with the entire routing paths from the client 102 to each of the targets. This may be accomplished by considering two different costs. The first cost is the cost associated with the corresponding routing paths between the autonomous systems, for example, the BGP AS_PATH length obtained via BGP. The second cost is the cost associated with corresponding routing paths between gateway devices such as routers within a single autonomous system, as obtained via an Interior Gateway Protocol (IGP) such as OSPF or IS-IS. OSPF Protocol Version 2 is disclosed in RFC 2328, J. Moy, April 1998. IS-IS Intra-Domain Routing Protocol is disclosed in RFC 1142, D. Oran, February 1990.

An IGP is a protocol for exchanging routing information between gateway devices within an autonomous network. Gateway devices may include, for example, routers and/or switches. As shown in FIG. 1, the IGP cost between R1 112 and R2 114 is 20, while the IGP cost between R1 112 and R3 116 is 80. If the NPS Server 1 106 were in possession of the IGP cost metrics, the NPS Server 1 106 would recommend the Proximity Target Address 3 122 associated with the first target. Unfortunately, the IGP cost metrics within the second Autonomous System, Autonomous System 2 110, are only visible within Autonomous System 2 110. As a result, network devices in other autonomous systems cannot accurately ascertain the optimal route. Accordingly, in this example, the first NPS Server, NPS Server 1 106, would provide an IP address of a target that would not be the optimal choice.

In accordance with various embodiments, a NPS Server receiving a request for a target address may redirect the request to a NPS Server in another autonomous system if it determines that the NPS Server is not in an autonomous system that is common to the paths to each of the targets. In this instance, since the NPS server is not in an autonomous system that is common to the paths to each of the targets, the NPS Server does not have access to Internal Gateway Protocol (IGP) information indicating a distance between the client and each of the two or more targets. Thus, in this example, the first NPS Server, NPS Server 1 106, may redirect the request to the second NPS Server, NPS Server 2 118.

Redirection of a request for a target address that has been received by a first NPS Server may be accomplished in a variety of ways. More particularly, the first NPS Server may forward the request to a second NPS Server, where the first NPS Server and the second NPS Server are in different autonomous systems. Alternatively, the first NPS Server may provide an IP address of the second NPS Server to the Service Router (or client), enabling the Service Router (or client) to resend the request to the second NPS Server.

In the example shown and described with reference to FIG. 1, the client 102 sending the request is in the same autonomous system as the NPS Server 106 initially receiving the request. However, the client need not be in the same autonomous system as the NPS Server to which the request is initially directed. For instance, as shown in FIG. 2, the client 102 may be in a different autonomous system from the NPS Server 1 106 (and Service Router 104) handling the request. Since the NPS Server 1 106 receiving the request from the client 102 is in a different autonomous system from the client 102, the request may be redirected to the NPS Server 2 118.

Figure 3:
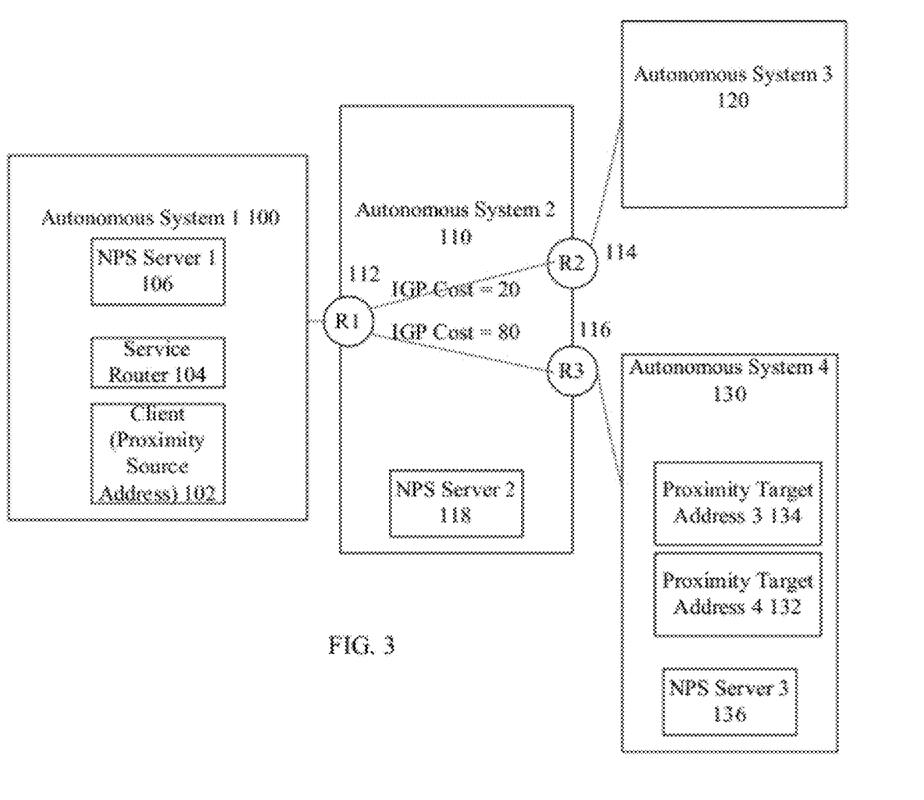
FIG. 3 is a diagram illustrating a third example system in which the disclosed embodiments may be implemented.

In the example shown in FIG. 3, the targets identified by Proximity Target Address 3 134 and Proximity Target Address 4 132 are both located in Autonomous System 4 130. In addition, the Autonomous System 4 130 also includes a third NPS Server, NPS Server 3 136. In accordance with one embodiment, where the targets are in a single autonomous system, the NPS Server 106 may redirect the request to a NPS Server in the same autonomous system as the targets. Therefore, in this example, the NPS Server 106 redirects the request to the third NPS Server, NPS Server 3 136.

Figure 2:
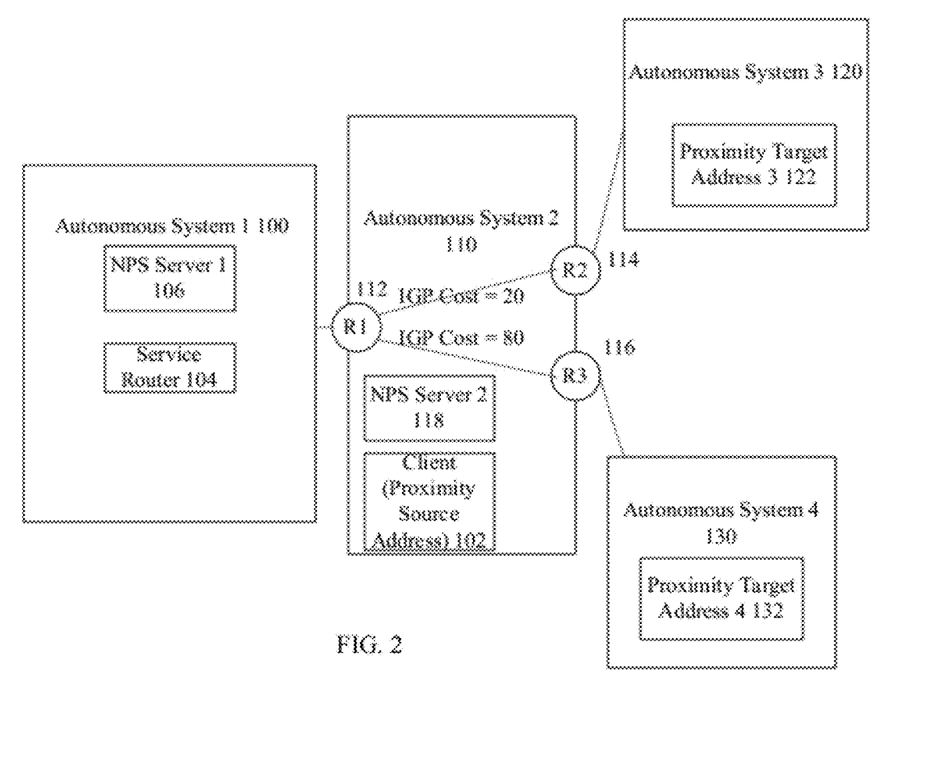
FIG. 2 is a diagram illustrating a second example system in which the disclosed embodiments may be implemented.

It is important to note that the examples shown and described with reference to FIGS. 1-3 are merely illustrative, and other system configurations may be implemented. These examples are simplified in order to simplify the description of the disclosed embodiments. Therefore, a system may include any number of autonomous systems, NPS Servers, and/or targets.

Figure 4:
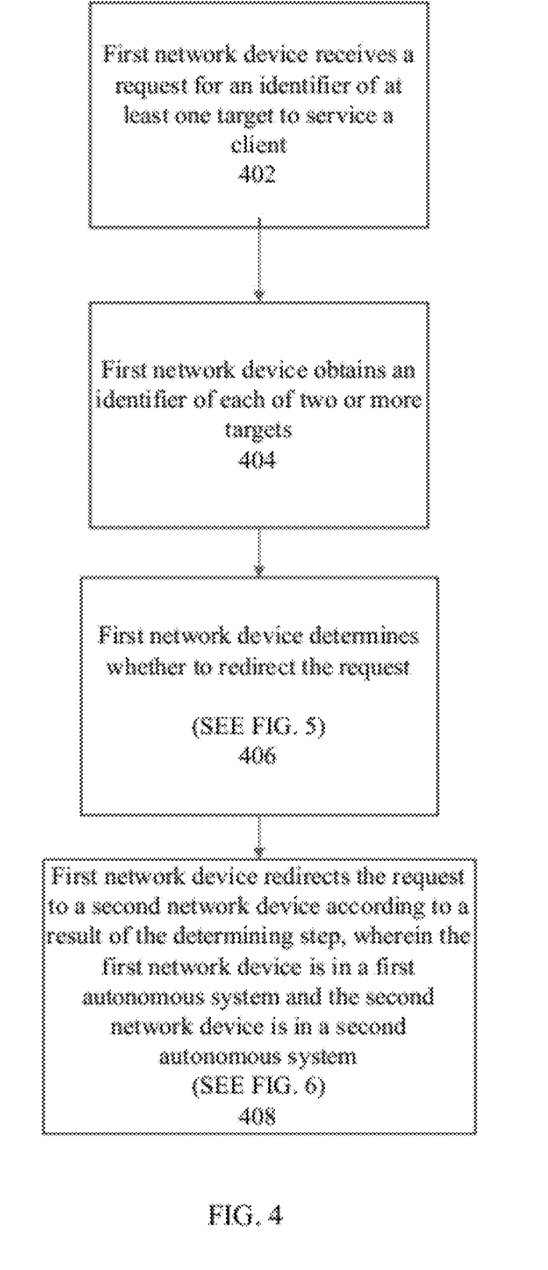
FIG. 4 is a process flow diagram illustrating a method of redirecting a request for a target address by a Network Positioning System (NPS) Server in accordance with various embodiments of the invention.

FIG. 4 is a process flow diagram illustrating a method of redirecting a request for a target address by a NPS Server in accordance with various embodiments of the invention. In order to ensure that each NPS Server receives cost metrics for distances between gateway devices of different autonomous systems, each NPS Server (or network device including a NPS Server) may register as BGP listener. After registering as a BGP listener, a NPS Server may receive BGP updates from gateway devices implementing BGP in accordance with Request for Comments (RFC) 1771, "A Border Gateway Protocol 4 (BGP-4)," Y. Rekhter and T. Li, March 1995. In addition, each NPS Server may register as an IGP listener in order to ensure that cost metrics for distances between gateway devices within an autonomous system may be received. More particularly, the IGP may be either OSPF or IS-IS protocol. Each NPS Server may thereafter receive IGP updates from the gateway devices within its autonomous system that implement an IGP In addition, each of the NPS Servers may obtain an IP address of other NPS Servers so that requests may be redirected, as appropriate. In one embodiment, each of the NPS Servers may be statically configured with the IP addresses of other NPS Servers. In an alternative embodiment, the NPS Servers may discover one another using a dynamic discovery protocol.

As shown in FIG. 4, a first network device may receive a request for an identifier of at least one target to service a client at 402. For example, a Service Router receiving the request from the client may provide the request (or information from the request) to the first network device (e.g., NPS Server). In one embodiment, a best-effort flag of the request may serve to indicate to a NPS Server whether it is to redirect the request, or process the request and return a result (e.g., ranked list of target IP addresses). Therefore, when the client sends the request, the best-effort flag may be initialized (e.g., not set) to indicate that the request is to be redirected.

The first network device may obtain an identifier (e.g., IP address) of each of two or more targets that may service the client at 404. For example, the Service Router may provide the IP address of each of the two or more targets to the first network device. The first network device (e.g., NPS Server) may then determine whether to redirect the request at 406.

In one embodiment, the first network device may determine whether to redirect the request by determining whether it has access to Internal Gateway Protocol (IGP) information indicating a distance between the client and each of the two or more targets. For example, the first network device may determine whether it is in an autonomous system that is common to paths between the client to each of the two or more targets. More particularly, if the first network device determines that it is in an autonomous system that is common to paths between the client to each of the targets, the first network device has access to IGP information indicating a distance between the client and each of the targets. A method of determining by a network device (e.g., NPS Server) whether to redirect a request will be described in further detail below with reference to FIG. 5.

The first network device may then redirect the request to a second network device (e.g., including a NPS Server) according to a result of the determining step at 408. More particularly, if the first network device determines that it is in an autonomous system that is common to the paths from the client to each of the two or more targets, the first network device will have access to IGP information indicating a distance to each of the two or more targets. The first network device may therefore choose not to redirect the request to a second network device, since the first network device may use the IGP information it receives in order to select a target having an optimum path to the client. However, if the first network device determines that it is not in an autonomous system that is common to the paths from the client to each of the two or more targets, the first network device will not have access to IGP information indicating a distance between the client and each of the two or more targets, and may choose to redirect the request to another network device (e.g., another NPS Server) in another autonomous system. More particularly, the first network device may choose to redirect the request to a second network device (e.g., another NPS Server) that is more likely to have access to the information that the first network device lacks in order to select a target having an optimum path, where the first network device is in a first autonomous system and the second network device is in a second autonomous system.

Upon redirecting the request, the first network device may set the best-effort flag in the request to instruct the second network device that it should do its best to compute the path costs and should not attempt to redirect the request to another network device (NPS Server) as doing so may cause a redirect loop. A method of redirecting the request to a second network device will be described in further detail below with reference to FIG. 6.

If the first network device (e.g., first NPS Server) does not redirect the request, the first network device may use IGP (and any EGP) cost information in order to identify an optimal path, and therefore, an optimal target. The first network device may then provide an identifier (e.g., IP address) of the optimal target to the Service Router or the client. Alternatively, if the first network device redirects the request, a second network device (e.g., second NPS Server) may use IGP (and any EGP) cost information in order to identify an optimal target. The second network device may then provide an identifier (e.g., IP address) of the optimal target to the first NPS Server, the Service Router, and/or the client.

Figure 5:
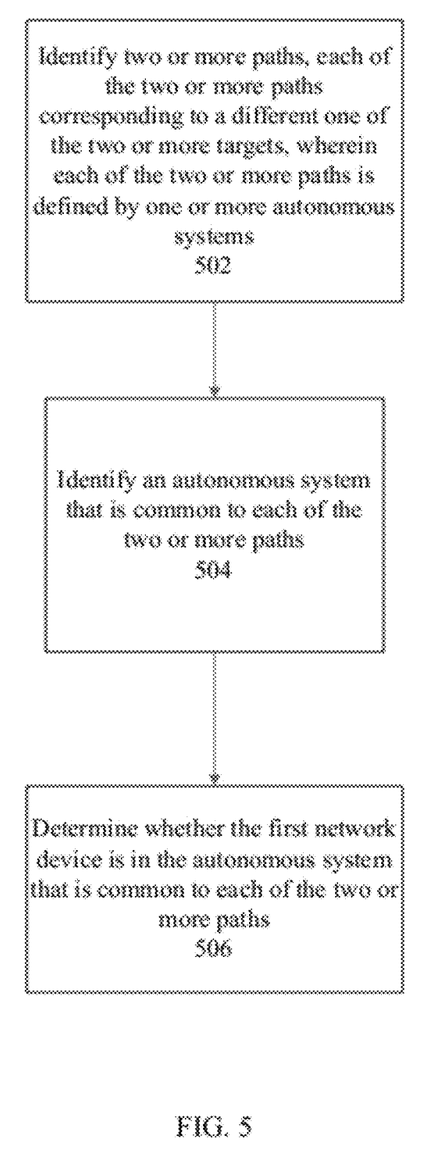
FIG. 5 is a process flow diagram illustrating a method of determining whether to redirect a request in accordance with various embodiments.

FIG. 5 is a process flow diagram illustrating a method of determining whether to redirect a request in accordance with various embodiments. The network device (e.g., NPS Server) may identify two or more paths at 502, where each of the two or more paths corresponds to a different one of the two or more targets. Each of the two or more paths may be defined by one or more autonomous systems between the client and a corresponding one of the two or more targets. The network device may identify an autonomous system that is common to each of the two or more paths at 504. The network device may then determine whether it is in the autonomous system that is common to each of the two or more paths at 506. If the network device is located in the autonomous system that is common to each of the two or more paths, the network device will have access to cost metrics internal to that autonomous system, and may therefore choose not to redirect the request. However, if the network device is not located in the autonomous system that is common to each of the two or more paths, the network device will not have access to cost metrics internal to that autonomous system, and may therefore choose to redirect the request.

In accordance with some embodiments, it may be desirable to redirect a request if the two or more targets are all located in the same autonomous system. If the two or more targets are all located in the same autonomous system, the network device may redirect the request to another network device (e.g., NPS Server) that is in that autonomous system and set the best-effort flag. However, if the two or more targets are not located in the same autonomous system, the network device may operate as described above with reference to FIG. 5.

Figure 6:
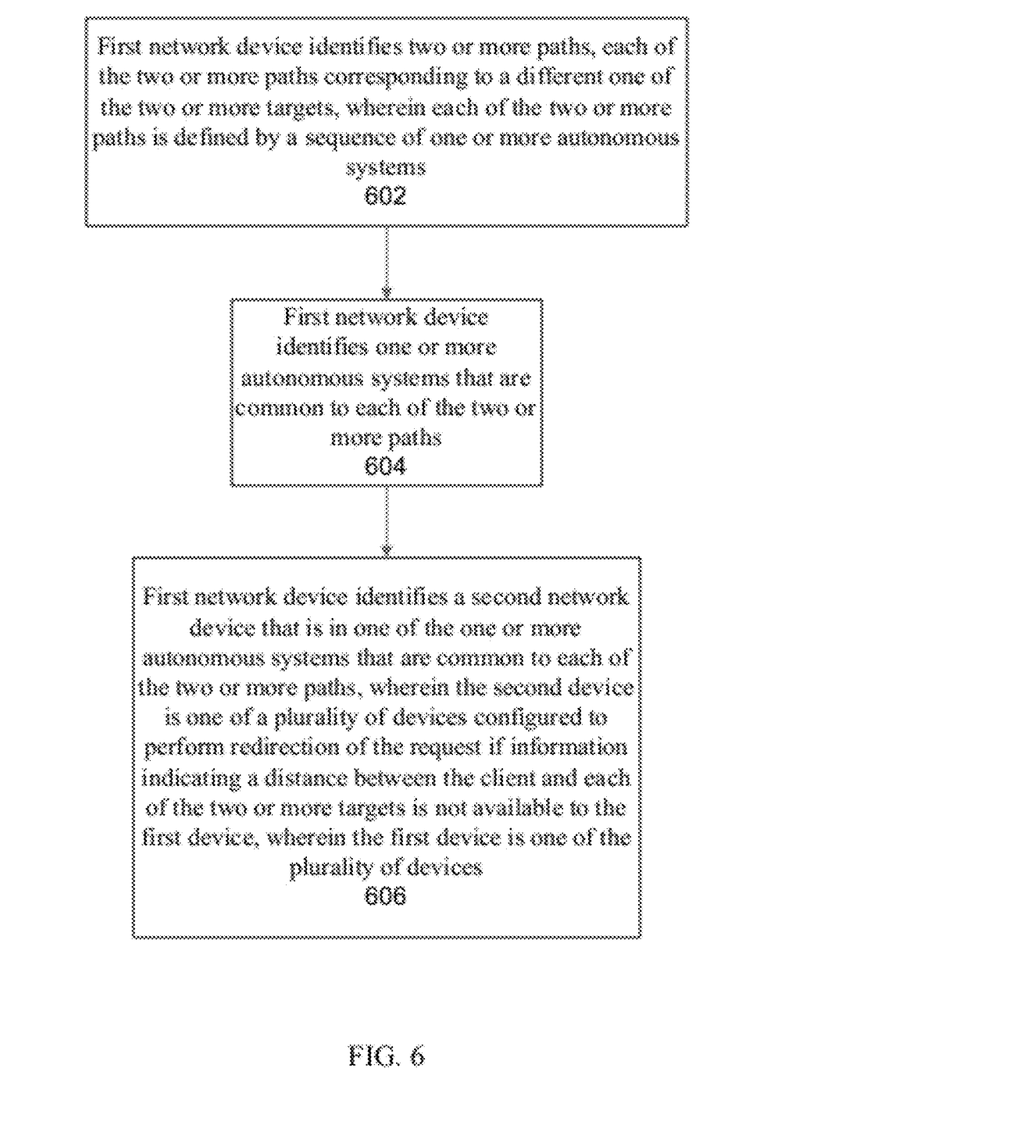
FIG. 6 is a process flow diagram illustrating a method of redirecting a request by a first network device including a first NPS Server to a second network device including a second NPS Server.

FIG. 6 is a process flow diagram illustrating a method of redirecting a request by a first network device including a first NPS Server to a second network device including a second NPS Server. The first network device may identify two or more paths at 602, where each of the two or more paths corresponds to a different one of the two or more targets. Each of the two or more paths may be defined by a sequence of one or more autonomous systems. The first network device may identify one or more autonomous systems that are common to each of the two or more paths at 604. The first network device may then identify a second network device that is in one of the one or more autonomous systems that are common to each of the two or more paths at 606. Both the first network device and the second network device may each include a NPS Server, where each NPS Server (or corresponding network device) may be configured to perform redirection of a request as shown and described with reference to FIG. 4.

In accordance with various embodiments, the first network device may choose to redirect the request according to various algorithms. For example, if the first network device is not in the autonomous system of the client (i.e., the local AS) and a network device including a NPS Server exists in the local AS, the first network device may redirect the proximity request to a second network device including a NPS Server in the client's AS and set the best-effort flag.

Furthermore, in some instances, the two or more paths may have more than one autonomous system in common. If the two or more paths have more than one autonomous system in common, the first network device may select one of the autonomous systems to which to redirect the request. For example, the first network device may select one of the autonomous systems that is closest to the two or more targets. In other words, the first network device may select the autonomous system that is common to the two or more paths, as well as identified as the last common autonomous system in the two or more paths (e.g., the corresponding sequences of autonomous systems).

Once the first network device identifies the autonomous system to which a request is to be redirected, the first network device may then identify a network device (e.g., including a NPS Server) in that autonomous system to which the request is to be redirected. More particularly, the first network device may identify a second network device (e.g., including a NPS Server) that is present in the identified autonomous system that is common to each of the two or more paths. The first network device may then redirect the request to the identified second network device. Assuming that the first network device (e.g., NPS Server) has obtained IP addresses of other network devices (e.g., having NPS Servers), the IP addresses may be used to identify the NPS Server that is in the identified autonomous system. Therefore, each of the network devices may include NPS Servers that are each configured to perform redirection of the request if the NPS Server is not in an autonomous system that is common to paths between the client and the two or more targets.

In one embodiment, when the first network device redirects the request to the second network device, the first network device sets a best-effort flag in the request to instruct the second network device that it should do its best to compute the path costs and should not attempt to redirect the request to another network device (NPS Server).

Upon receiving a redirected request, the second network device may ascertain from the request that the best-effort flag is set. As a result, the second network device understands that it is to compute the path costs and not redirect the request. The second network device (e.g., NPS Server) may identify potential costs associated with "branches" to the two or more targets. More particularly, the second network device may look up a target IP address in a table such as that shown and described with reference to FIG. 7A. Upon locating the target IP address in the table, the second network device may obtain a Next-Hop IP address from a corresponding table entry. The second network device may then look up that Next-Hop IP address to obtain a corresponding cost from a table such as that shown and described with reference to FIG. 7B. In this manner, the second network device may ascertain an IGP cost for a particular target. The second network device may ascertain the IGP cost for each of the two or more targets in a similar fashion.

Figure 7A:
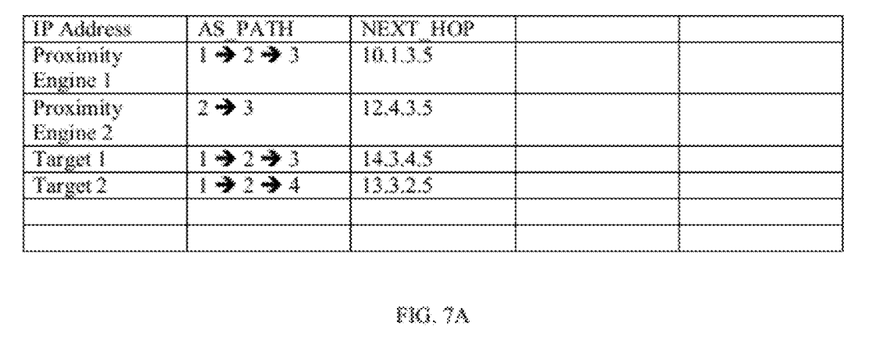
FIGS. 7A-B are example tables that may be maintained by each of the NPS Servers in accordance with various embodiments.
Figure 7B:
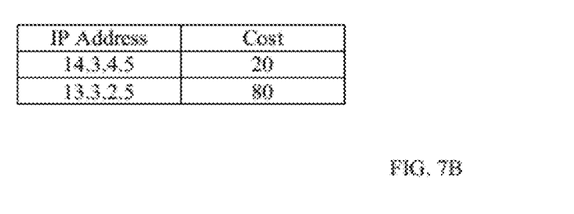

FIGS. 7A-B are example tables that may be maintained by each of the NPS Servers in accordance with various embodiments. More particularly, a NPS Server within an autonomous system may receive EGP (e.g., BGP) update messages from gateway devices in other autonomous systems, as well as IGP (e.g., IS-IS and OSPF) updates messages from gateway devices within the autonomous system. In accordance with various embodiments, upon receiving an EGP (e.g., BGP) update message, a NPS Server may update a table such as that shown in FIG. 7A. More particularly, the NPS Server may obtain information from AS_PATH and NEXT_HOP attributes of a BGP update message.

As disclosed in RFC 1771, the AS_PATH attribute is generally composed of a sequence of AS path segments. Each AS path segment is represented by a triple <path segment type, path segment length, path segment value>. The path segment type is a 1-octet long field with the value of 2 to indicate that the segment type is an AS_SEQUENCE, which identifies an ordered set of ASs—a route in the update message has traversed. In other words, the AS_SEQUENCE may include a sequence of AS identifiers (e.g., ASNs). The path segment length is a 1-octet long field containing the number of ASs in the path segment value field. The path segment value field contains one or more AS numbers, each encoded as a 2-octets long field. The NEXT_HOP attribute is described in RFC 1771 as defining the IP address of the border router that should be used as the next hop to the destinations listed in the Network Layer Reachability field of the update message. Therefore, the IP address specified in the table may be obtained from the Network Layer Reachability field of the update message.

The table shown in FIG. 7A may include a plurality of entries, where each of the entries corresponds to a different IP address. These IP addresses may include target addresses, as well as addresses of NPS Servers. As shown in this example, the table may include columns such as AS_PATH and NEXT_HOP. Thus, each entry may identify an IP address, a path identifying a sequence of autonomous systems from the NPS Server to the IP address (AS_PATH), and a next hop address of a router in the path from the NPS Server to the IP address (NEXT_HOP).

In order to identify a path to a particular target, the NPS Server may simply locate the IP address of the target in the table in order to identify the appropriate table entry. From the table entry, the NPS Server may ascertain a path identifying a sequence of autonomous systems (e.g., ASNs) from the NPS Server to the IP address. The sequence of autonomous systems may be obtained in this manner for two or more targets, enabling the sequences to be compared in order to identify an autonomous system that is common to the paths to all of the targets. More particularly, an identity of an AS (e.g., last ASN) in a sequence of ASNs may be ascertained, wherein the ASN identifies the autonomous system that is common to each of the paths to the targets.

Once the common autonomous system is identified, a first NPS Server may identify a second NPS Server in the common autonomous system. More particularly, the first NPS Server may ascertain an IP address of a second NPS server by first ascertaining the network prefix of the common autonomous system. More particularly, the first NPS Server may ascertain a network prefix of the other NPS Servers (e.g., via a BGP routing table). From the network prefix of the other NPS Servers, it is possible to identify the NPS Server in the common AS. For example, if the common AS is AS 2, then the NPS Server having a prefix 2.2.118.0/24 is the NPS Server in AS 2. Similarly, a NPS Server having a prefix 3.X.XXX.X/24 may be identified as being in AS 3. The first NPS Server may then redirect the request to the second NPS Server.

Upon receiving an IGP (e.g., IS-IS or OSPF) update message, the NPS Server may update a table such as that shown in FIG. 7B. More particularly, the NPS Server may obtain a cost and corresponding destination IP address from the IGP update message. As shown in FIG. 7B, for each IP address, the table may specify a cost that it takes to reach that IP address from the NPS Server. If the NPS Server is in the same autonomous system as the "fork" in the path to the targets, the NPS Server will have access to cost information for the different branches to the targets In order to identify the pertinent cost information, a NPS Server may identify a target IP address in the table of FIG. 7A in order to identify a next hop address. The NPS Server may then identify the next hop address in the IP address column of the table of FIG. 7B in order to identify the pertinent table entry. From the table entry, the NPS Server may ascertain the cost to reach the next hop address. The NPS Server may repeat this process for each target IP address, enabling the NPS Server to ascertain the "internal" cost to reach each target IP address.

The second NPS Server may use the IGP cost information for the "branches" to each of the targets in order to identify the optimal path, and therefore the optimal target. More particularly, the second NPS Server may use any EGP cost information in combination with the IGP cost information to ascertain a total cost associated with a particular target. The total costs for each of the targets may then be compared in order to identify the optimal target. The second NPS Server may then provide an identifier of the optimal target to the first NPS Server, the Service Router, and/or the client.

It is important to note that the above-described data structures are merely illustrative. Therefore, it is contemplated that other types of data structures or formats may be used to store data such as that described herein.

Generally, the techniques for performing the disclosed embodiments may be implemented on software and/or hardware. For example, they can be implemented in an operating system kernel, in a separate user process, in a library package bound into network applications, on a specially constructed machine, or on a network interface card. In a specific embodiment, the disclosed techniques are implemented in software such as an operating system or in an application running on an operating system.

A software or software/hardware hybrid packet processing system of the disclosed embodiments may be implemented on a general-purpose programmable machine selectively activated or reconfigured by a computer program stored in memory. Such programmable machine may be a network device designed to handle network traffic. Such network devices typically have multiple network interfaces. Specific examples of such network devices include routers, switches, and access points. For example, the packet processing systems of the disclosed embodiments may be implemented via wireless controller models 4400 series and 2006 series, and access points models 1000 series and 12xx series available from Cisco Systems, Inc. of San Jose, Calif. The network devices may be specially configured routers such as specially configured router models 1600, 2500, 2600, 3600, 4500, 4700, 7200, 7500, 12000 and Carrier Routing System (CRS) available from Cisco Systems, Inc. of San Jose, Calif. A general architecture for some of these machines will appear from the description given below. Further, the disclosed embodiments may be at least partially implemented on a card (e.g., an interface card) for a network device or a general-purpose computing device.

Figure 8:
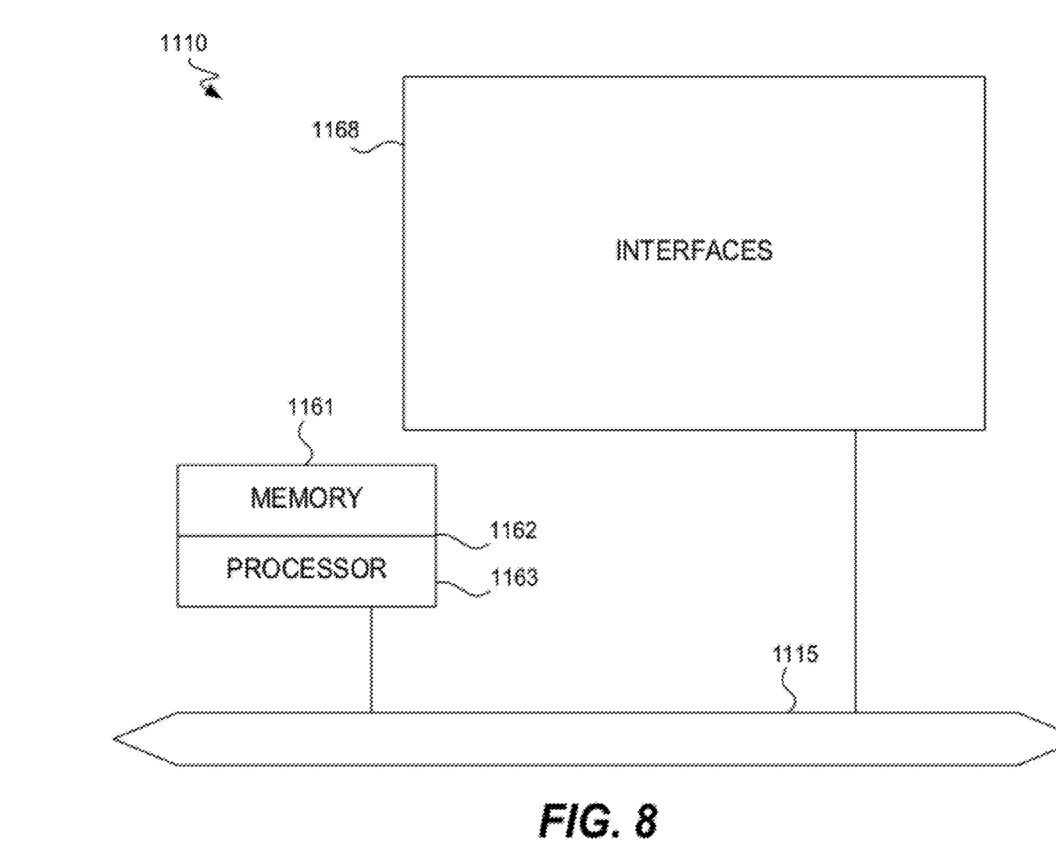
FIG. 8 is a diagrammatic representation of an example network device in which various embodiments may be implemented.

In one embodiment, a network device implementing the disclosed embodiments is a router. Referring now to FIG. 8, a router 1110 suitable for implementing the disclosed embodiments includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for implementing the disclosed embodiments, in whole or in part. The router may accomplish these functions under the control of software including an operating system (e.g., the Internetwork Operating System (IOS®) of Cisco Systems, Inc.) and any appropriate applications software. CPU 62 may include one or more processors 1163 such as a processor from the Motorola family of microprocessors or the MIPS family of microprocessors. In an alternative embodiment, processor 1163 is specially designed hardware for controlling the operations of router 10. In a specific embodiment, a memory 1161 (such as non-volatile RAM and/or ROM) also forms part of CPU 1162. However, there are many different ways in which memory could be coupled to the system. Memory block 1161 may be used for a variety of purposes such as, for example, caching and/or storing data, programming instructions, etc.

The interfaces 1168 are typically provided as interface cards (sometimes referred to as "line cards"). Generally, they control the sending and receiving of data packets or data segments over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, Asynchronous Transfer Mode (ATM) interfaces, High-Speed Serial Interface (HSSI) interfaces, Packet over Synchronous Optical Network (POS) interfaces, Fiber Distributed Data Interface (FDDI) interfaces, Local Area Network (LAN) interfaces, Wireless Area Network (WAN) interfaces, metropolitan area network (MAN) interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 8 is one specific router that may be used to implement the disclosed embodiments, it is by no means the only router architecture on which the disclosed embodiments can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 1165) configured to store data, program instructions for the general-purpose network operations and/or the inventive techniques described herein. The program instructions may control the operation of an operating system and/or one or more applications, for example.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although illustrative embodiments and applications of the disclosed embodiments are shown and described herein, many variations and modifications are possible which remain within the concept, scope, and spirit of the disclosed embodiments, and these variations would become clear to those of ordinary skill in the art after perusal of this application. Moreover, the disclosed embodiments need not be performed using the steps described above. Accordingly, the present embodiments are to be considered as illustrative and not restrictive, and the disclosed embodiments are not to be limited to the details given herein, but may be modified within the scope and equivalents of the appended claims.

What is claimed is:

1. A method, comprising:
   receiving a request by a first network device in a first autonomous system from a client for an address of a target to service the client;
   identifying a plurality of targets based on the request;
   obtaining at least two of a plurality of paths, wherein each path of the plurality of paths is between the client and a different target of the plurality of targets, wherein the first autonomous system does not include cost metrics associated with the at least two of the plurality of paths;
   determining that the first network device is not in an autonomous system that is common to the at least two of the plurality of paths;
   based on the determination, identifying a plurality of candidate autonomous systems that are common to the at least two of the plurality of paths;
   selecting a second autonomous system that is closest and common to the at least two of plurality of paths from among the plurality of candidate autonomous systems, wherein the second autonomous system includes cost metrics associated with the at least two of the plurality of paths; and
   redirecting the request by the first network device to a second network device in the second autonomous system,
   wherein the cost metrics comprise interior gateway protocol (IGP) information associated with the at least two of the plurality of paths, wherein the IGP information includes a prioritized list of paths from the client to the at least two of the plurality of targets.

2. The method of claim 1, wherein the cost metrics are only accessible from the second autonomous system.

3. The method of claim 1, wherein each of the plurality of candidate autonomous systems includes cost metrics associated with the at least two of the plurality of paths.

4. The method of claim 1, wherein redirecting the request comprises:
   identifying a second plurality of paths, each of the second plurality of paths corresponding to a different one of the plurality of targets, wherein each of the second plurality of paths is defined by a sequence of one or more autonomous systems; and identifying the second autonomous system as being common to at least two of the second plurality of paths; and
redirecting the request to the second network device.

5. The method of claim 4, wherein selecting the second autonomous system comprises:
determining whether the at least two of the second plurality of paths have a plurality of autonomous systems in common; and
when it is determined that the at least two of the second plurality of paths have the plurality of autonomous systems in common, selecting one of the plurality of autonomous systems as the second autonomous system.

6. The method of claim 4, wherein selecting the second autonomous system comprises:
identifying Internet protocol addresses of a plurality of network devices comprising the first network device and the second network device; and
identifying the second network device that is in the second autonomous system using the Internet protocol addresses.

7. The method of claim 6, wherein the each of the plurality of network devices is configured to perform redirection of the request when the each of the plurality of network devices is not in an autonomous system that is common to paths between the client and the plurality of targets.

8. The method of claim 1, further comprising:
determining whether the plurality of targets is in a same autonomous system; and
redirecting the request to a third network device in the same autonomous system when it is determined that the plurality of targets are in the same autonomous system.

9. The method of claim 1, wherein at least one of the plurality of targets is in the third autonomous system.

10. The method of claim 1, wherein the client is in the first autonomous system.

11. The method of claim 1, wherein the client is not in the first autonomous system.

12. The method of claim 1, wherein a fourth network device is one of a plurality of devices configured to perform redirection of the request when the one of the plurality of network devices is not in an autonomous system that is common to paths between the client and the plurality of targets.

13. A network device in a first autonomous system, the network device comprising:
one or more processors; and
a computer-readable storage medium storing instructions which, when executed by the one or more processors, cause the one or more processors to perform operations comprising:
receiving a request for an address of a target to service a client;
identifying a plurality of targets based on the request;
obtaining at least two of a plurality of paths, wherein each path of the plurality of paths is between the client and a different target of the plurality of targets, wherein the first autonomous system does not include cost metrics associated with the at least two of the plurality of paths;
determining that a first network device is not in an autonomous system that is common to the at least two of the plurality of paths;
based on the determination, identifying a plurality of candidate autonomous systems that are common to the at least two of the plurality of paths;
selecting a second autonomous system that is common to the at least two of plurality of paths from among the plurality of candidate autonomous systems and closest to the plurality of targets, wherein the second autonomous system includes cost metrics associated with the at least two of the plurality of paths; and
redirecting the request by the first network device to a second network device in the second autonomous system,
wherein the cost metrics comprise interior gateway protocol (IGP) information associated with the at least two of the plurality of paths, wherein the IGP information includes a prioritized list of paths from the client to the at least two of the plurality of targets.

14. The network device of claim 13, wherein each of the plurality of candidate autonomous systems includes cost metrics associated with the at least two of the plurality of paths.

15. The network device of claim 13, wherein at least one of the plurality of targets is in a third autonomous system.

16. The network device of claim 13, wherein a fourth network device is one of a plurality of network devices configured to perform redirection of the request when the one of the plurality of network devices is not in an autonomous system that is common to paths between the client and the plurality of targets.

17. A non-transitory computer readable storage medium storing one or more sequences of instructions executable by one or more processors to perform a set of operations comprising:
receiving a request by a first network device in a first autonomous system for an identifier of a target to service a client;
identifying a plurality of targets based on the request;
obtaining at least two of a plurality of paths, wherein each of the plurality of paths is between the client and a different target of the plurality of targets, wherein the first autonomous system does not include cost metrics associated with the at least two of the plurality of paths;
determining that a first network device is not common to the at least two of the plurality of paths;
based on the determination, identifying a plurality of candidate autonomous systems that are common to the at least two of the plurality of paths;
selecting a second autonomous system that is closest and common to the at least two of the plurality of paths from among the plurality of candidate autonomous systems, wherein the second autonomous system includes cost metrics associated with the at least two of the plurality of paths; and
redirecting the request by the first network device to a second network device in the second autonomous system;
wherein the cost metrics comprise interior gateway protocol (IGP) information associated with the at least two of the plurality of paths, wherein the IGP information includes a prioritized list of paths from the client to the at least two of the plurality of targets.

18. The non-transitory computer readable storage medium of claim 17, wherein the client is associated with the first autonomous system.

19. The non-transitory computer readable storage medium of claim 17, wherein each of the plurality of candidate autonomous systems includes cost metrics associated with the at least two of the plurality of paths.

20. The non-transitory computer readable storage medium of claim 17, wherein the each of the plurality of network devices is configured to perform redirection of the request when each of the plurality of network devices is not in an autonomous system that is common to paths between the client and the plurality of targets.

* * * * *